United States Patent [19]

Henton

[11] 4,209,401
[45] Jun. 24, 1980

[54] FILTER DRIER

[75] Inventor: Paul V. Henton, St. Louis, Mo.

[73] Assignee: Emerson Electric Co., St. Louis, Mo.

[21] Appl. No.: 897,952

[22] Filed: Apr. 20, 1978

[51] Int. Cl.² ............................................. B01D 27/02
[52] U.S. Cl. .................................. 210/136; 210/266;
210/DIG. 6
[58] Field of Search .......................... 55/316, 387–389;
62/474; 210/136, 266, 282–284, 287–289, 352,
356, 483–485, 502, DIG. 6, DIG. 7

[56] References Cited

U.S. PATENT DOCUMENTS

| 2,583,812 | 1/1952 | Briggs et al. | 210/DIG. 6 |
|---|---|---|---|
| 3,308,957 | 3/1967 | Klein | 210/282 |
| 3,680,707 | 8/1972 | Zeek | 210/352 |
| 3,802,564 | 4/1974 | Turman | 210/136 |
| 3,815,752 | 6/1974 | Hoffman et al. | 210/282 |
| 4,029,580 | 6/1977 | Lange | 210/136 |

FOREIGN PATENT DOCUMENTS 860103  1/1971  Canada ...................................... 62/474

*Primary Examiner*—Ivars C. Cintins
*Attorney, Agent, or Firm*—Polster, Polster and Lucchesi

[57] ABSTRACT

A filter drier finding application in a refrigeration system, for example, includes a tubular housing having improved fluid flow characteristics within the filtering media of the filter drier. The filter drier includes an axial arrangement of elements commencing at the inlet end of the housing with an absorbent material fill portion which extends across the diameter of the housing. The absorbent material fill portion includes first and second boundary layers spaced from one another, and absorbent material positioned between the boundary layers. The boundary layers are pervious to fluid flow. The axially innermost boundary layer, with respect to the inlet, includes a central hub portion which seats a first end of a coil compression spring. The coil compression spring has a tubular body part and an enlarged second end. Filter media in the form of a fibrous material is mounted about the body part of a coil compression spring, the filter material being sized so that an unobstructed flow path exists between its outer periphery and the inner periphery of the housing. A retainer is mounted along the second end of the spring and closes the flow path so that fluid flow necessarily passes through the filter material toward the center of the filter. Finally, a final layer of fibrous filter material and a positioning plate are provided along the outlet end of the housing.

15 Claims, 4 Drawing Figures

U.S. Patent   Jun. 24, 1980   4,209,401
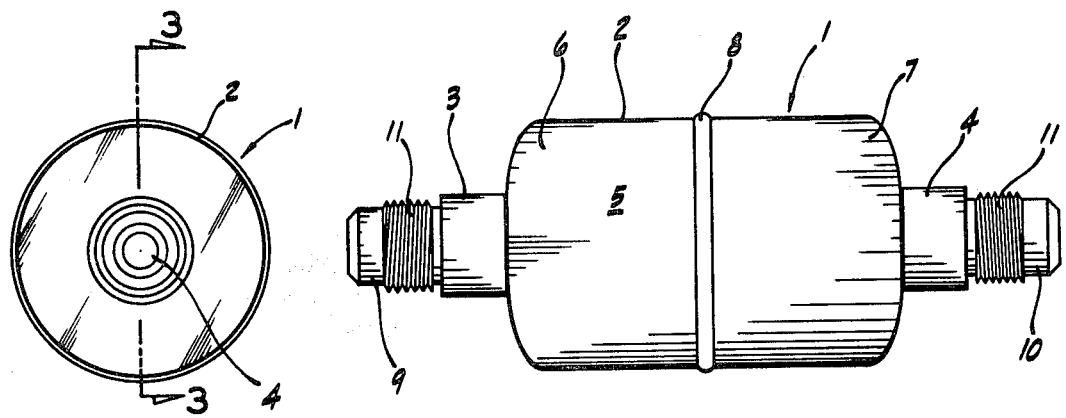
FIG. 2.
FIG. 1.
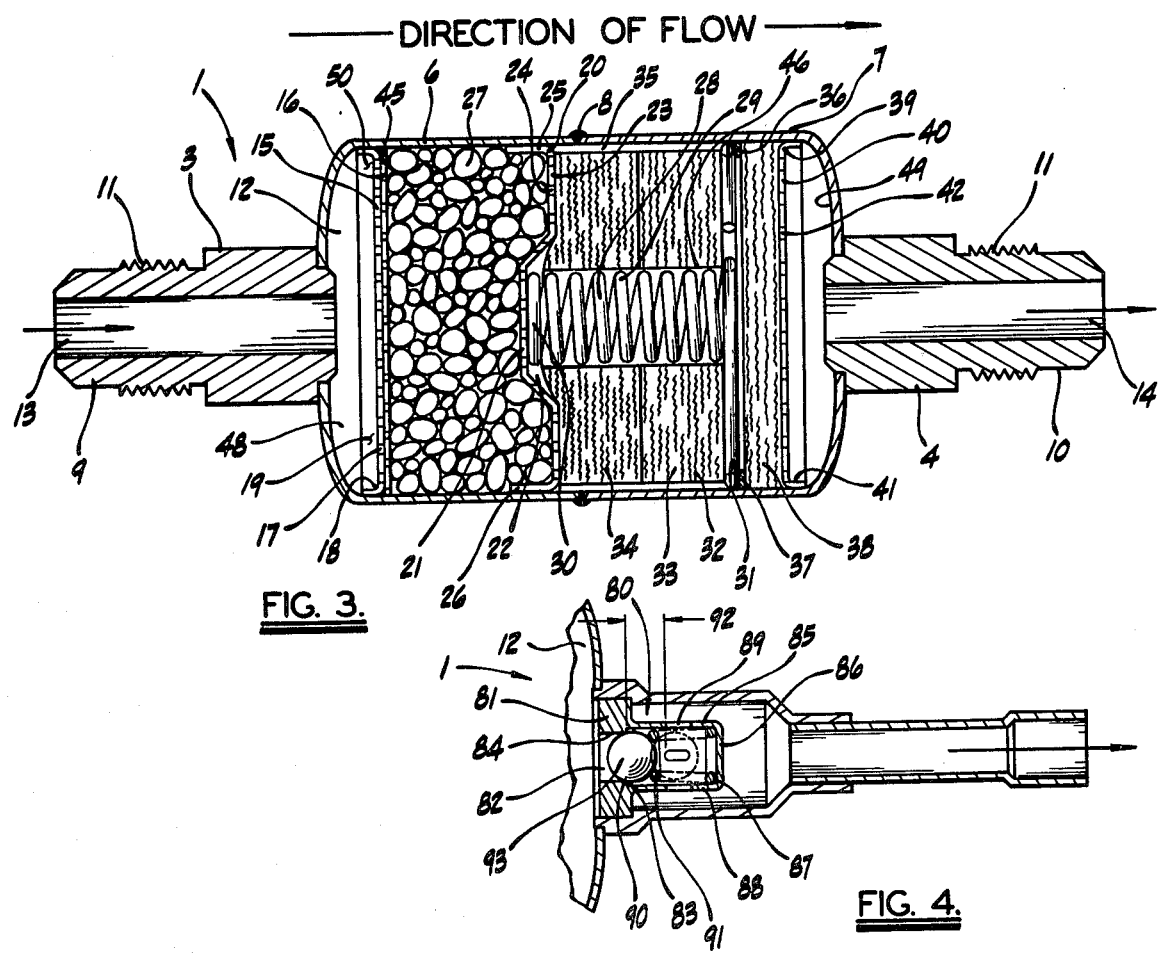
FIG. 3.
FIG. 4.

FILTER DRIER

BACKGROUND OF THE INVENTION

This invention relates to filter driers, and in particular, to filter driers employed in refrigeration systems. While the invention is described with particular reference to its application in such systems, those skilled in the art will recognize the wider applicability of the inventive principles disclosed hereinafter.

A number of devices are available in the prior art for filtration of the fluid circulating in a refrigeration system. Included are molded core types in which the desiccant is preformed into a predetermined shape, the desiccant serving to remove moisture and to act as a filter media for filtration. Another type employs loose fill desiccant restrained by pervious retaining plates under spring pressure. A second portion of the device contains a fibrous filter media for filtration.

While these devices work well for their intended purposes, they generally are characterized by relatively high manufacturing costs. In addition, little attention has been given to effective use of the bulk of the fibrous filter material. The invention disclosed hereinafter is constructed so that maximum use of the filtering material is possible, all flow through the filter by design passing through a large bulk of fibrous material. In addition, the flow pattern is designed so that fluid flows from the outer area of the fibrous material towards its center so that the entire body fibrous of filter material is available for filtration purposes. Consequently, the filter is slower to clog than devices previously available in the prior art, and contributes little pressure drop to the refrigeration system.

One of the objects of this invention is to provide a low cost filter design.

Another object of this invention is to provide a low cost filter drier having improved flow characteristics.

Yet another object of this invention is to provide a filter drier that will consistently provide uniform operation.

Other objects of this invention will be apparent to those skilled in the art in light of the following description and accompanying drawings.

SUMMARY OF THE INVENTION

In accordance with this invention, generally stated, a filter drier, finding application in refrigeration systems, for example, is provided which utilizes a construction giving an improved flow characteristic in that all fluid entering the filter drier passes from an outboard to an inboard part of a fibrous filter element. Consequently, a consistent rate of fluid flow through the filter is provided, regardless of filter blockage that occurs over the useful life of the filter. In the preferred embodiment, the filter drier includes a housing having loose fill desiccant section confined between first and second plates of pervious material. The second plate has a central hub defining a receptacle. The receptacle receives one end of a spring having a cylindrical body section of substantially smaller size than the interior diameter of the housing. A second end of the spring has an enlarged end turn approximately equal to the interior diameter of the housing. At least one fibrous pad is mounted over the body section of the spring, the pad being sized so that an unobstructed flow passage exists along the outer periphery of the fibrous material, between that periphery and an inner wall of the housing. The central area of the fibrous pad inboard of the spring body section also provides an unobstructed flow passage. An antibypass plate is mounted along the axially outer end of the housing so as to close the peripheral flow passage, thereby forcing fluid flow inwardly of the fibrous material toward the flow path through the central spring area. A final fiberglass pad is mounted between the antibypass ring and a plate positioned at the outlet end of the housing.

BRIEF DESCRIPTION OF THE DRAWINGS

In the drawings,

FIG. 1 is a view in side elevation of one illustrative embodiment of filter drier of this invention;

FIG. 2 is an end view thereof;

FIG. 3 is a sectional view taken along the line 3—3 of FIG. 2; and

FIG. 4 is a sectional view, partly broken away of the outlet end of a second illustrative embodiment of filter drier of this invention.

DESCRIPTION OF THE PREFERRED EMBODIMENT

Referring now to FIG. 1, reference numeral 1 indicates one illustrative embodiment of filter drier device of this invention. The device 1 includes a housing 2 having an inlet 3 and an outlet 4.

Housing 2 is conventional and generally includes a tubular body member 5 formed from a first section 6 and a second section 7. The sections 6 and 7 are joined along a central seam 8 by any conventional method. Welding or brazing works well, for example.

The inlet 3 and outlet 4 are defined by conventional fittings 9 and 10 which are, in the embodiment illustrated, identical to one another. The fittings 9 and 10 may assume a variety of configurations, depending upon the connection requirements imposed on the device 1 by any particular application. In the embodiment illustrated, each of the fittings 9 and 10 have a threaded portion 11 for intermounting the filter drier device 1 into the fluid lines of refrigeration system, not shown.

The housing 2 defines a chamber 12, and the fittings 9 and 10 have axial openings 13 and 14, respectively, communicating with the chamber 12.

A plate 50 is mounted on the inlet side 3 of the housing 2. The plate 50 includes first and second generally planar surfaces 15 and 16, respectively, having a plurality of perforations 17 extending through them. The plate 50 also has a peripheral lip 18 integrally formed from the material thickness delimiting the surfaces 15 and 16. The lip 18 extends perpendicularly to the surface 15 in the embodiment illustrated, along an extension 19. The lip 18 serves to locate the plate 15 against an interior wall 48 within the section 6 part of the body member 5.

If desired, a screen element 45 may be positioned along the surface 16 side of the plate 50. Screen 45 functions to prevent shake out of small particles from a loose fill desiccant material within the housing 2, later described in greater detail. Because the perforations 17 in plate 50 are relatively large, small particles of the loose fill desiccant can pass through it, particularly if the filter is handled roughly during installations, for example. The use of the screen 45 tends to prevent such passage. The screens 45, however, often can be eliminated in various applicational uses of the filter 1.

A cup plate 20 is spaced axially from the plate 50, and includes a central hub section 21 defining a receptacle 22. The receptacle 22 preferably is perforate, although it can be made imperforate, if desired. In any event, an annular surface 23 extends radially outboardly of the hub 21. Surface 23 has a plurality of openings 24 formed in it. The plate 20 also includes a peripheral line 25 integrally formed with the surface 23. The lip 25 extends perpendicularly to the surface 23, along a projection 26. The projection 26, in the embodiment of FIG. 3, extends axially toward the inlet end 3 of the housing 2. The space between the plates 50 and 20 is filled with a loose fill desiccant material, indicated generally by the reference numeral 27. Loose fill material 27 is conventional and may comprise any of a variety of desiccants available commercially. Silica gel, sova bead, activated alumina work well, for example.

A coil compression spring 28 has a body section 29 of generally cylindrical shape defined by the coils of the spring 28. Body section 29 has a first end 30 and a second end 31. The ends 30 and 31, in each instance, are formed by the coils of the spring. However, the end 31 is enlarged, that end being defined by a single turn of the spring 28. The end 30 is sized for reception in the receptacle 22 defined by the plate 20. The body section 29 of the spring 28 has a diameter substantially smaller than the inner diameter of the body member 5.

At least one fibrous pad element 32 is positioned between the plate 20 and the end 31 of the spring 28. In the embodiment illustrated, the fibrous filter element 32 is constructed from a pair of annular pads 33 and 34, respectively. The pads 33 and 34 are identical and are generally circular in plan, having a central opening 46 in them, the opening 46 being sized to receive the body section 29 of the spring 28. The pads 33 and 34 preferably are constructed from a fiberglass material, although other materials may be utilized, if desired. I find the use of pad pairs facilitates element 32 construction between the pads 33 and 34 are easily cut from commercially available fiberglass stock. The filter element 32 has a diameter chosen so that it is slightly less than the interior diameter of the body member 2. This is an important feature of my invention, because the pad-body member diameter relationship means a generally unobstructed fluid flow path 35 exists along the perimeter of the filter element 32, as is best seen in FIG. 3.

An antibypass plate 36 is mounted axially outboard of the end 31 of the spring 28. Antibypass plate 36, in the embodiment illustrated, is an annular device having a ring 37 of material sized to support the end 31 of the spring, and to close the flow path 35 against further axial fluid flow from the plate 36 toward the outlet 4.

A final filter 38 is positioned axially outboard of the antibypass plate 36. The final filter 38 also is constructed from a porous fibrous material. Again, fiberglass works well, for example. The final filter 38 is positioned with the housing 2 so that it extends completely across the interior dimension of the body member 5.

A plate 39 is mounted near the outlet 4 of the housing 2. The plate 39 is similar to the plate 50 and includes a generally planar surface 40 having a lip 41 integrally formed with it. The lip 41 serves to locate the plate 39 with respect to the housing 2 by abutting an interior wall 49 of the section 7. Surface 40 has a plurality of openings 42 in it, which permit fluid flow toward the outlet 10. The overall size of the housing 2 is chosen so that locating the plates 50, 15 and 39 and the elements therebetween cause slight compression of the final filter 38 and the filter media 32 along with some compression of the spring 28. These compression forces act on the plate 20 to compress the loose fill material 27, thereby holding that material in a compacted mass.

In operation, the filter 1 is inserted in a refrigerant line (not shown), for example. Fluid flow through the inlet passes through the plate 50 and screen 45, in those applications where screen 45 is utilized. Thereafter, the fluid passes through the loose fill material 27, which is designed to remove acids, water and wax materials from the refrigerant. As the refrigerant fluid passes through the plate 20, the previous hub 21 allows flow toward the inner portion of the body member 5. That is to say, as the fluid approaches the plate 20, it passes through the openings 24. Once the flow passes the openings 24, device 1 construction directs the flow through the filter element 32. The flow path 35 is important in providing the generally constant flow output of the device 1. Thus, at least initially, in attempting to find the least resistive flow path, some of the fluid will flow along the path 35 until the fluid reaches the antibypass plate 36. The plate 36 acts to block further axial flow, and forces the flow pattern radially inwardly of the filter element 32. As the filter element collects particles etc. from the fluid, it becomes blocked. Because of the flow pattern design, that blockage, as it occurs in time, starts near the antibypass plate 36 and progresses axially back toward the inlet side of the device 1. As filtering continues, the fluid can continue to flow unimpeded through the device 1, because additional blockage merely forces the fluid toward the opening 46 defined by the body section 29 of the spring 28. Consequently, fluid flow will remain at a predetermined level of consistency for the relatively long operating life of the filter.

When the prevention of reverse fluid flow or back flow through the filter 1 is important, the outlet 4 of the filter 1 is modified as shown in FIG. 4. Prevention of reverse flow through the valve is important, for example, in heat pump applications, where the refrigerant flow direction is reversed to provide either heating or cooling operating modes for the heat pump system. In effect, a heat pump system is a reverse flow refrigeration system and the filter 1 as modified in FIG. 4 may be connected in parallel in such a system. That is to say, two of the filters are employed, one of which operates during each operating mode of the heat pump system.

The modification of the filter occurs at its outlet end in that the outlet includes a valve means 80 positioned to control flow from the chamber 12 of the filter 1 to the outlet 4.

The valve means 80 includes a base 81 having a central opening 82 through it. An axially outer face 83 of the base 81 defines a valve seat 84 for the valve means 80. A cap 85 is integrally formed with the base 81 and has a closed end 86 defining a seat for a spring 87. The cap 85 includes a generally cylindrical side wall 88 having at least one slot 89 formed in it. In the particular embodiment illustrated, the side wall 88 has a pair of slots 89 formed in it, on diametrically opposite sides of the cap 85. A valve member 90 is biased by an end 91 of the spring 87 toward a closed position of the valve means. As illustrated, preferably valve member 90 is a ball 93. Other valve members are compatible with the broader aspects of this invention. I have found the location of the slot or slots 89 in the side wall 88 to be important. That is to say, the slot 89 is positioned a distance 92 from the valve seat 84. This spacing is determined by the diameter of the ball 93 utilized as the valve member 90. As may be observed in FIG. 4, the internal diameter of the cap 85 is substantially equal to the diameter of the ball 93. Consequently, fluid pressure acting from the inlet side of the filter 1 must overcome the bias of the spring 87 and positively lift the valve member 90 from the valve seat 84, driving the valve member toward the end 86 of the cap 85 past the slot 89, before fluid flow through the valve means 80 is established. This is important in that the construction ensures positive valve movement before fluid flow occurs. Conversely, in the reverse cycle situation, the entire fluid pressure of the system is available at the slots 89 to act, in conjunction with the force provided by the spring 87, on the valve member 90, ensuring that it seats against the valve seat 84, preventing back flow through the filter 1.

Numerous variations, within the scope of the appended claims, will be apparent to those skilled in the art in light of the foregoing description and accompanying drawings. Thus, the design silhouette of the housing or other components of the filter 1 may vary in other embodiments of this invention. Relative size of the components described in conjunction with the preferred embodiment may be changed. Likewise, the fittings defining the inlets and outlets for the housing may be altered in applicational use. Although various materials were described as preferred, other materials may be substituted for those described. Other valve constructions may be used to prevent back flow through the filter. These variations are merely illustrative.

Having thus described the invention, what is claimed and desired to be secured by Letters Patent is:

1. A filter drier, comprising:
   an elongated housing defining a chamber having a preselected diameter, said housing including an inlet and an outlet communicating with said chamber;
   a first perforate plate positioned in said housing near said inlet;
   a second perforate plate positioned in said housing and spaced from said first plate, said second plate having a hub area formed in it;
   adsorptive material fill between said first and said second plates;
   a spring, said spring including a cylindrical body portion having a first end and an enlarged second end, the first end of said spring being sized for reception in the hub area of said second plate said body portion defining an axial flow passage;
   filter media of inorganic fibrous material having a central opening therein mounted over said cylindrical body section of said spring, said filter media having a width less than the diameter of said housing to define an annular flow passage along the inner periphery of said housing; and
   antibypass means mounted adjacent the enlarged second end of said spring to block said peripheral flow passage so that fluid entering said inlet passes through said absorptive material, at least some flow passing along said annular flow passage until resistance to said flow forces the fluid inwardly of said filter media toward said axial flow passage.

2. The filter drier of claim 1 including second filter media of inorganic fiber material positioned in said chamber axially outboard of said antibypass means; and a third perforate plate positioned in said housing near said outlet.

3. The filter drier of claim 2 wherein said first and second filter media of inorganic fibrous material are constructed from fiberglass.

4. The filter drier of claim 3 wherein said adsorptive material fill comprises silica gel.

5. The filter drier of claim 4 further including a wire screen member adjacent said first perforate plate, on the axially inboard side thereof.

6. The filter drier of claim 4 further including valve means along the outlet thereof, said valve means preventing back flow through said filter drier.

7. The filter drier of claim 6 wherein said valve means comprises a valve seat, a valve member movably mounted with respect to said valve seat between a first closed position and second open position;
   means for biasing said valve member toward said closed position, enclosure means about said valve member and said valve seat, said closure means having an opening in it for permitting fluid flow therethrough, said opening and said valve member being arranged so that said valve member moves a predetermined distance from said valve seat toward said open position before fluid flow through said valve occurs.

8. A filter drier, comprising:
   a housing having an inlet, an outlet, and an internal diameter;
   an absorbent material fill portion positioned along the inlet side of said housing and across the diameter thereof, said absorbent material fill portion including first and second boundary layers spaced from one another, and absorbent material contained between said boundary layers, said second boundary layer having a central receptacle formed in it;
   a coil compression spring having a central body part, said part having a first end positioned in said receptacle and an enlarged second end;
   filter media of fibrous material, said material having a central opening therethrough for placing said material about the body portion of said spring, said fibrous material having a dimension less than the diameter of said housing so as to define a flow path along the outer perimeter thereof between said housing and said filter media, said flow path having an annular shape in cross section;
   antibypass means mounted in said housing, said antibypass means having a portion closing the annular flow path along the second end of said spring so that fluid flow through said filter passes through said filter media toward said coil compression spring;
   second filter means axially outboard of said antibypass means; and
   a perforate plate outboard of said second filter means.

9. The filter drier of claim 8 further including valve means along the outlet thereof, said valve means preventing back flow through said filter drier.

10. The filter drier of claim 9 wherein said fibrous material filter media comprises fiberglass.

11. The filter drier of claim 10 wherein said absorbent material fill comprises silica gel.

12. A filter drier, comprising:
   a housing having an inlet, an outlet, and an internal diameter;
   an absorbent material fill portion positioned along the inlet side of said housing, said absorbent material fill portion including first and second boundary layers spaced from one another, and absorbent material contained between said boundaries;

a coil compression spring having a central body part, said body part having a first end abutting one of said first and said second boundary layers of said absorbent material fill portion and an enlarged second end;

filter media of fibrous material, said material having a central opening therethrough for placing said material about the body portion of said spring;

second filter means axially outboard of the second end of said spring;

a perforate plate outboard of said second filter means; and valve means along the outlet side of said filter drier, said valve means including a valve seat, a valve member movably mounted with respect to said valve seat between a first closed position and a second open position and enclosure means about said valve seat, said enclosure means having at least one opening therein for permitting fluid flow therethrough, said opening being positioned with respect to said valve member so that said valve member moves a positive predetermined distance from said valve seat before fluid flow through said opening is possible.

13. The filter drier of claim 12 wherein the filter media of fibrous material has a dimension less than the diameter of said housing so as to define a flow path along the outer perimeter thereof between said housing and said filter media, said flow path having an annular shape in cross section, and antibypass means mounted in said housing, said antibypass means having a portion closing said annular flow path along the second end of said spring, so that fluid flow through said filter passes through said filter media toward said coil compression spring.

14. In a filter drier including a housing having an inlet and an outlet, and filter means in said housing, the improvement comprising valve means on the outlet side of said filter drier, said valve means including means for defining a valve seat along said outlet, all fluid flow through said filter drier passing through said valve seat, a ball valve member movably mounted with respect to said valve seat between a first closed position and a second open position, said ball valve member having an external diameter, means for biasing said ball valve member toward said closed position, closure means containing said valve member, said closure means having an internal diameter approximately equal to the external diameter of said ball valve member and adapted to receive said ball valve member in a free, sliding fit, said closure means having at least one opening therein for permitting fluid flow through said valve seat, said valve member and said opening being arranged so that said valve member moves a predetermined, positive distance from said valve seat along said closure means before fluid flow through said valve seat and said opening occur.

15. A filter drier, comprising:

a housing having an inlet, an outlet, and an internal diameter; an absorbent material fill portion along the inlet side of said housing, said absorbent material fill portion including first and second boundary layers spaced from one another, and absorbent material contained between said boundaries;

a coil compression spring having a central body part, said body part having a first end abutting one of said first and said second boundary layers of said absorbent material fill portion and an enlarged second end;

filter media of fibrous material, said material having a central opening therethrough for placing said material about the body portion of said spring, said fibrous material having a dimension less than the diameter of said housing so as to define a flow path along the outer perimeter thereof between said housing and said filter media, said flow path having an annular shape in cross section;

antibypass means in said housing, said antibypass means having a portion closing the annular flow path along the second end of said spring so that fluid flow through said filter passes through said filter media toward said coil compression spring so that removal of contaminents carried in said fluid by said filter commences at the end of said filter nearest the outlet of said housing; and second filter means axially outboard of said antibypass means.

* * * * *

UNITED STATES PATENT AND TRADEMARK OFFICE
CERTIFICATE OF CORRECTION

PATENT NO. : 4,209,401
DATED : June 24, 1980
INVENTOR(S) : Paul V. Henton

It is certified that error appears in the above-identified patent and that said Letters Patent are hereby corrected as shown below:

Column 3, line 38, "between" should be "because".
Column 3, line 58, "dimension" should be "diameter".
Column 4, line 13, "previous" should be "pervious".

Signed and Sealed this

Third Day of March 1981

[SEAL]

Attest:

RENE D. TEGTMEYER

Attesting Officer

Acting Commissioner of Patents and Trademarks